(12) United States Patent
Gay et al.

(10) Patent No.: US 6,966,741 B2
(45) Date of Patent: Nov. 22, 2005

(54) TIPPING APPARATUS FOR INTERMODAL CONTAINER

(75) Inventors: William Gay, Bronxville, NY (US); David Gavrich, San Francisco, CA (US); Phil Embrescia, Middlesex, NJ (US)

(73) Assignee: Transload of North America, Inc., Scarsdale, NY (US)

( * ) Notice: Subject to any disclaimer, the term of this patent is extended or adjusted under 35 U.S.C. 154(b) by 0 days.

(21) Appl. No.: 10/387,855

(22) Filed: Mar. 13, 2003

(65) Prior Publication Data

US 2003/0175100 A1 Sep. 18, 2003

Related U.S. Application Data

(60) Provisional application No. 60/363,796, filed on Mar. 13, 2002.

(51) Int. Cl.[7] .............................................. B65G 7/11
(52) U.S. Cl. ...................... 414/662; 414/663
(58) Field of Search .............................. 414/420, 421, 414/422, 423, 424, 641, 662, 663

(56) References Cited

U.S. PATENT DOCUMENTS

| | | | | |
|---|---|---|---|---|
| 3,653,526 A | * | 4/1972 | Kennedy, Jr. | 414/420 |
| 3,971,484 A | * | 7/1976 | Anderson et al. | 414/559 |
| 4,015,735 A | * | 4/1977 | Berglund et al. | 414/420 |
| 4,095,708 A | * | 6/1978 | Gerhard | 414/420 |
| 4,203,697 A | * | 5/1980 | Cayton | 414/345 |
| 4,281,956 A | * | 8/1981 | Pickrell | 414/409 |
| 4,321,004 A | * | 3/1982 | Mills | 414/490 |
| 4,838,752 A | * | 6/1989 | Bryant | 414/421 |
| 4,958,978 A | * | 9/1990 | Shedleski | 414/483 |
| 5,011,360 A | * | 4/1991 | Abram et al. | 414/424 |
| 5,015,146 A | * | 5/1991 | Barnes et al. | 414/639 |
| 5,054,989 A | * | 10/1991 | Fell | 414/607 |
| 5,055,582 A | * | 10/1991 | Garland et al. | 546/256 |
| 5,152,369 A | * | 10/1992 | Nakaoka | 182/129 |
| 5,238,357 A | * | 8/1993 | Patrick et al. | 414/420 |
| 5,256,023 A | * | 10/1993 | Patrick et al. | 414/420 |
| 5,288,197 A | * | 2/1994 | Harris | 414/495 |
| 5,362,198 A | * | 11/1994 | Patrick | 414/810 |
| 5,388,948 A | * | 2/1995 | Jerome | 414/425 |
| 5,466,116 A | * | 11/1995 | Jerome | 414/809 |
| 5,897,283 A | * | 4/1999 | Lenguyen | 414/490 |
| 6,050,767 A | * | 4/2000 | Gay et al. | 414/139.9 |
| 6,439,668 B1 | * | 8/2002 | Hagenbuch et al. | 298/18 |
| 6,558,111 B2 | * | 5/2003 | Wilson et al. | 414/810 |
| 6,572,319 B1 | * | 6/2003 | Simmons et al. | 414/143.2 |
| 6,715,980 B2 | * | 4/2004 | Bouthillier | 414/642 |
| 6,776,178 B1 | * | 8/2004 | Glynn et al. | 135/115 |

* cited by examiner

Primary Examiner—Kathy Matecki
Assistant Examiner—Rashmi Sharma
(74) Attorney, Agent, or Firm—Baker Botts LLP

(57) ABSTRACT

An apparatus for removing bulk cargo from an intermodal container, which includes an upper frame mounted on an intermodal container transfer equipment device, a middle frame mounted on the upper frame and a lower frame mounted on the middle frame with the lower frame engaging an intermodal container. The middle and lower frames are arranged to pivot with respect to each other about an axis near one end of the frames. A winch motor is positioned on the upper frame and a cable is attached to the lower frame so the lower frame can pivot away from the upper and middle frames and empty the contents of the intermodal container.

11 Claims, 5 Drawing Sheets

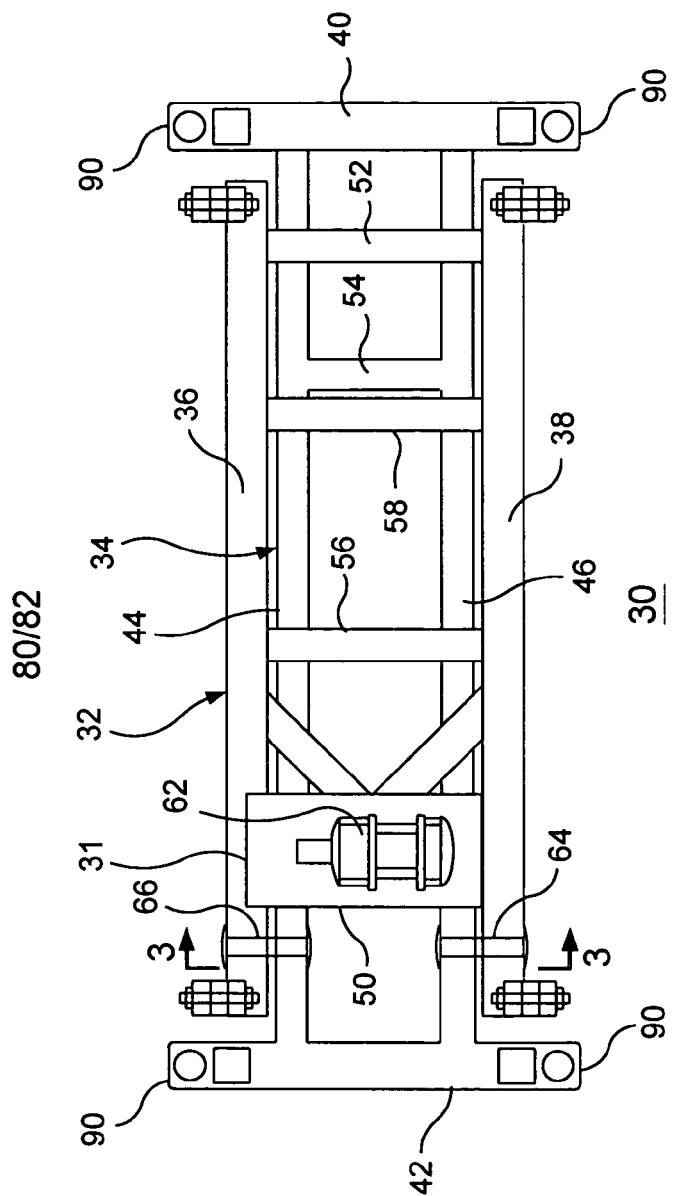
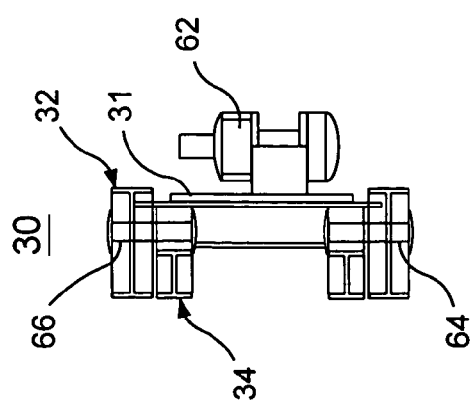

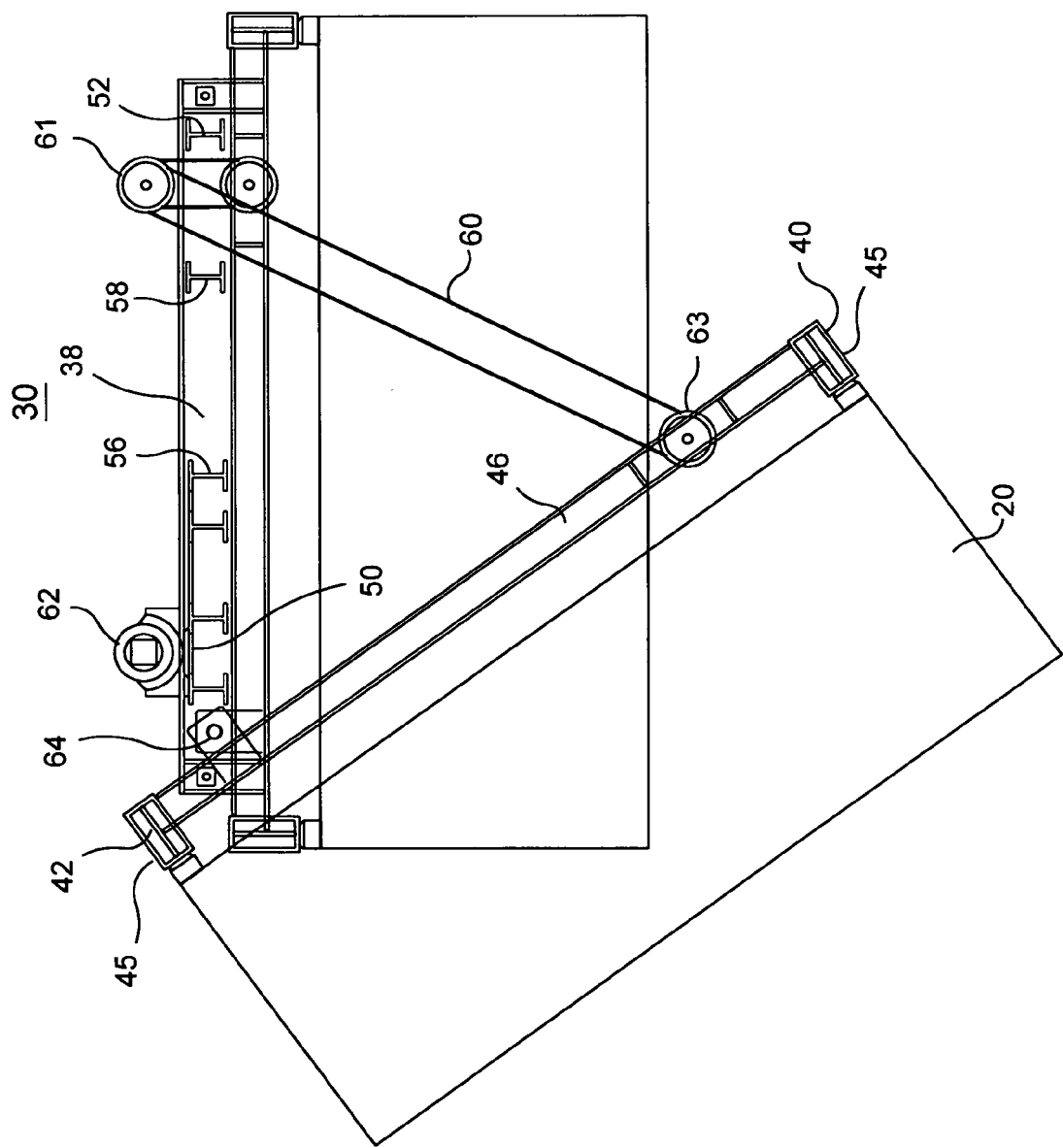

TIPPING APPARATUS FOR INTERMODAL CONTAINER

SPECIFICATION

This application claims the benefit of Provisional Application Ser. No. 60/363,796 filed Mar. 13, 2002.

BACKGROUND OF INVENTION

Intermodal containers are commonly used in the transport of a variety of materials including materials transported in bulk. Intermodal containers are conventionally handled by various loading/unloading equipment to transfer the containers, between transportation vehicles, such as railroad flat cars, trucks and steamships. For example, a lift truck 10, as shown in FIG. 1, may be used to handle and transfer the containers between trucks and railroad flat cars, or to reposition containers in a yard. In some instances bulk cargo must be removed from the intermodal container into another container for shipment, processing or storage. For example, contaminated soil may need to be transferred from an intermodal container to a railroad hopper car for shipment to a remote processing site. As a result there remains a need for an efficient method of emptying intermodal containers and thereby transferring bulk material from the container into another receptical. The present invention satisfies this need by providing an apparatus for removing bulk cargo from an intermodal container. The invention may be used, for example, to transfer material into a railroad hopper car or for numerous other purposes, such as emptying intermodal containers of grain, chemicals, coal or the like, in order to transfer the materials for further shipment, e.g. by bulk carrier, or to unload the materials at a destination.

SUMMARY OF THE INVENTION

In accordance with the invention there is provided a tipping apparatus for removing bulk cargo from an intermodal container. In a preferred embodiment of the invention the intermodal container tipping apparatus includes a middle frame which is arranged to be carried by an intermodal container transfer equipment device, and a lower frame arranged to be mounted on an intermodal container. The middle frame and the lower frame are pivotably connected to each other at a first longitudinal end and are arranged to pivot with respect to each other about a pivot axis at the first longitudinal end. A winch motor is positioned on the middle frame and includes a cable to pivot the lower frame toward or away from the middle frame to empty the contents of an intermodal container mounted to the lower frame.

The upper frame may be carried by any intermodal container transfer device such as a crane, a gantry arrangement or a fork lift. The middle frame may be carried by an upper frame attached to the transfer device. The upper frame and the middle frame may be connected by adjustable mounting members. In a preferred arrangement the adjustable mounting members are connected to the transfer equipment device through electrical, pneumatic or hydraulic lines for operator control. In still a further embodiment, the lower frame and the middle frame may be fixed, with respect to each other, using first twist lock connections. The first twist lock connections may be connected to the transfer device through electric, pneumatic or hydraulic lines so that the connections may be controlled by an operator. In a further embodiment, the lower frame is arranged to be connected to a container using second twist lock connections. The second twist lock connections may be connected to the transfer device through electric, pneumatic or hydraulic lines so that the connections may be controlled by an operator. A pulley system including the cable may be provided interconnecting the middle and lower frames. In still a further embodiment the intermodal container used with the present invention may include a door on one longitudinal end. The door may have electrically, hydraulically or pneumatically operated connections and may be connected to the transfer equipment device through electric, pneumatic or hydraulic lines for operator control.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 2 is a top view of an embodiment of the present invention.

FIG. 3 is a cross sectional view of the FIG. 2 embodiment of the present invention.

FIG. 4 is a side view of the FIG. 2 embodiment of the present invention.

DETAILED DESCRIPTION OF THE INVENTION

Figure 1:
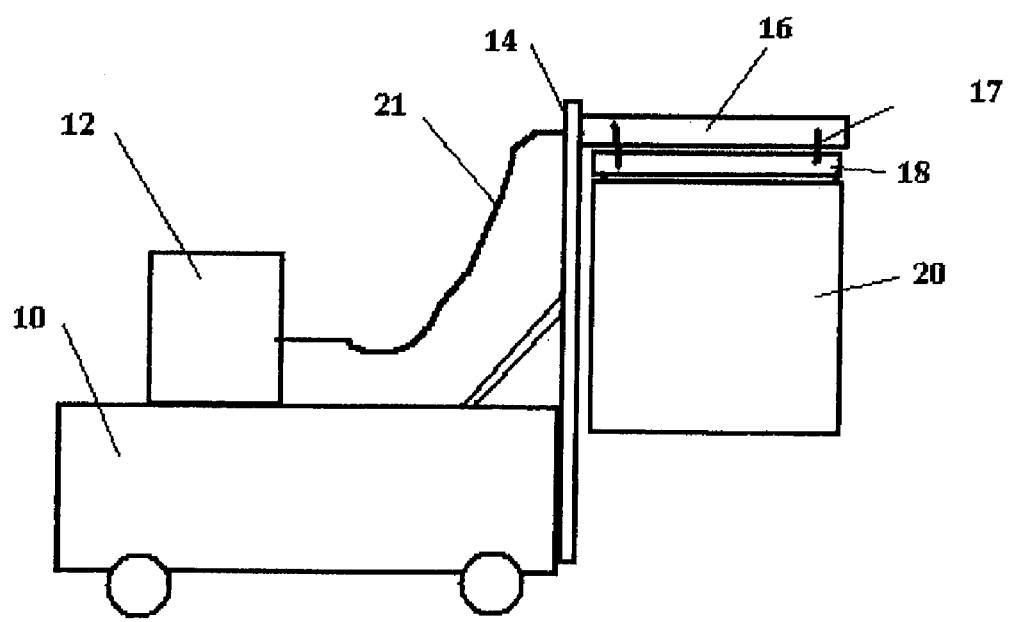
FIG. 1 is a side view of an intermodal container lift truck according to the prior art.

According to the present invention an intermodal container tipping apparatus is provided for removing bulk cargo from an intermodal container. The tipping apparatus is mounted on an intermodal container transfer device such as a crane, a gantry arrangement or a lift truck. For example, as shown in FIG. 1, the loading/unloading equipment may be a lift truck 10. The conventional lift truck 10, which may be a Mi-Jack Mast Packer, has an intermodal container engaging frame 18 mounted on an upper frame 16 by chains 17. Operating parts are provided for controlling the longitudinal position and angular orientation of engaging frame 18 with respect to upper frame 16. Frame 18 includes twist locks which engage standard corner brackets of an intermodal container 20. The truck 10 includes an operator compartment 12, a lift mechanism 14 and upper frame 16, attached to lift mechanism 14. Frame 18 may alternately be carried by a crane or gantry arrangement for lifting the containers onto a steamship or railroad car.

Figure 5:
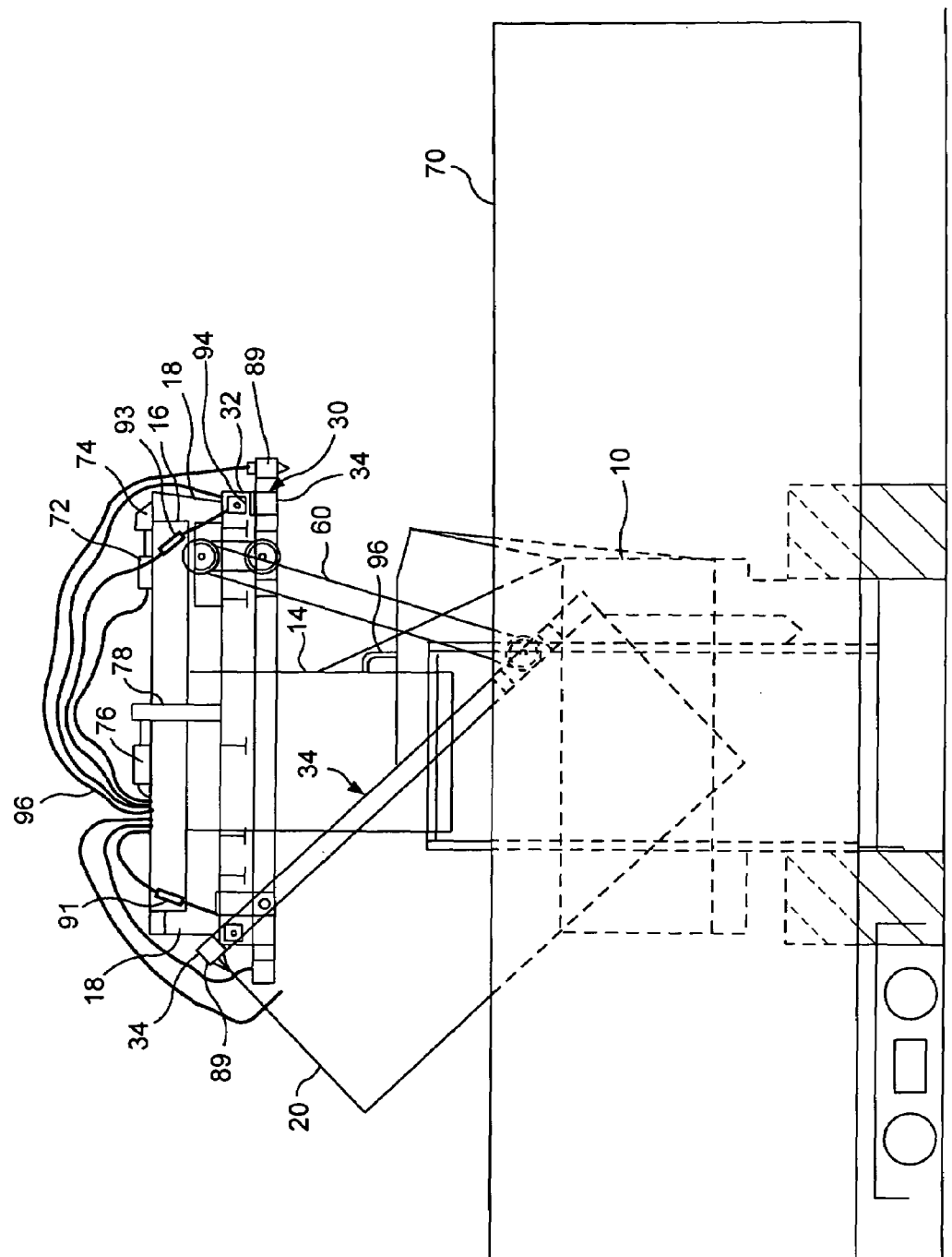
FIG. 5 is a side view showing the FIG. 2 embodiment of the present invention mounted on a lift truck.

In accordance with the invention there is provided a lifting and tipping apparatus 30 shown in FIGS. 3 to 5 which is arranged to be carried by an intermodal container transfer device. FIG. 2 is a top view of a lifting and tipping apparatus 30 according to one embodiment of the invention. Lifting and tipping apparatus 30 is comprised of two generally rectangular frames including a middle frame 32 and a lower frame 34. The apparatus is arranged to mount to a loading device, such as loader 10 shown in FIG. 1, by middle frame 32, which is mounted to upper frame 16 in place of container engaging frame 18. The middle frame 32 carries the lower frame 34, which is arranged to pivot about an axis formed by pivot pins 64 and 66 which connect first longitudinal ends of middle frame 32 and lower frame 34. The middle frame 32 includes supporting platform 50, which carries winch 62, which may be an electric, hydraulic or pneumatic motor operated winch. The middle frame 32 further includes longitudinal beams 36 and 38 and cross beams 52, 56 and 58. The lower frame 34 includes longitudinal beams 44 and 46, end cross beams 40 and 42, and intermediate cross beam 54.

FIG. 3 is a cross sectional view of lifting and tipping apparatus 30 of FIG. 2 showing winch motor 62 mounted on top of cross beam 31 which supports platform 50.

FIG. 4 illustrates apparatus 30 with lower frame 34 in untilted and tilted positions carrying an intermodal container 20. Winch 62 winds a cable 60, which passes through first pulleys 61, mounted on the middle frame 32 near the second longitudinal end, to second pulley 63 mounted on lower frame 34, causing lower frame 34 to pivot toward or away from middle frame 32 whereby causing the contents of intermodal container 20 are emptied from the second longitudinal end, for example, into a hopper car or the hold of a ship. In one arrangement, there are three pulleys on middle frame 32 and three pulleys on lower frame 34. Cross beams 40 and 42 of lower frame 34 are provided with twist lock fittings 45 for engaging the corners of intermodal container 20.

Figure 6:
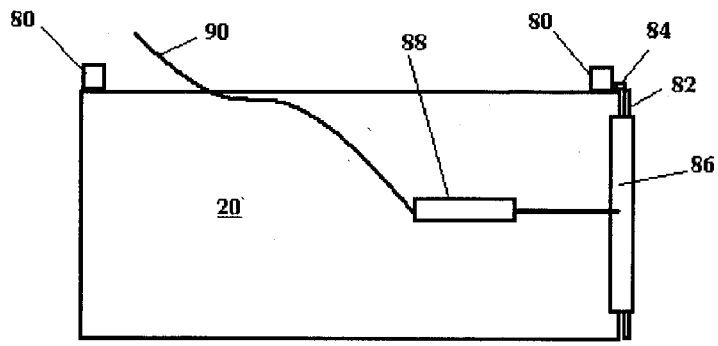
FIG. 6 is a top view of intermodal container useful with the FIG. 2 embodiment of the present invention.
Figure 7:
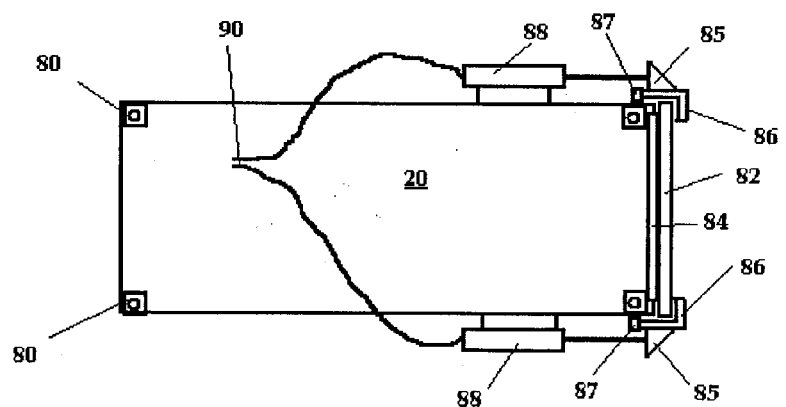
FIG. 7 is a side view of the intermodal container of FIG. 6.

An intermodal container suitable for use with the apparatus of the present invention is shown in FIGS. 6 and 7. In the side view of FIG. 6, container 20 includes connecting members 80 on the top thereof arranged to be engaged by twist locks for lifting the container. One longitudinal end of container 20 includes a door 82 mounted at the top by hinge 84, such that door 82 can pivot open for dumping the contents of container 20. Door 82 is arranged to be held in a closed position by clamping members 86, which are arranged along the side edges of door 82 and pivot on hinges 87 in response to activation of pneumatic cylinders 88 pulling levers 85. Cylinders 88 are supplied with operating air by air lines 90. Alternately, operation can be by hydraulic cylinders or electrical solenoids.

When container 20 is being tilted to empty the contents thereof, the operator of the lift truck or other device can release the door at the appropriate time by supplying air to cylinders 88 to pivot clamping members 86 away from door 82 to allow door 82 to pivot open and release the contents.

FIG. 5 shows the apparatus 30 of the invention mounted on a lift truck 10 and dumping contents of container 20 into a railroad hopper car 70. The assembly includes the upper frame 16 of the truck on which is mounted middle frame 32 of apparatus 30. Middle frame is mounted using chains 30 and arranged for operator adjustment of the position of frames 32 and 34 with respect to upper frame 16. Such adjustment is helpful in connection with aligning twist locks 90 on lower frame 34 with the corresponding mounting members 80 on container 20. Accordingly pneumatic piston 76 is connected to frame member 78, which is mounted to middle frame 32, and serves to adjust middle frame 32 and lower frame 34 in a direction corresponding to the longitudinal length thereof. Cylinder 72 is connected to lever 74 which supports chain 18 and is arranged to adjust the angular position of frames 32 and 34 by rotation the frames in a plane corresponding to the view of FIG. 5. Cylinders 80 and 82 are arranged to correct the leveling of the frames in a vertical plane perpendicular to FIG. 5 and to adjust the angular position in a horizontal plane, when cylinders 80 and 82 are independently operated.

In addition to positional adjustment, electrical, pneumatic or hydraulic connection is provided to operate the door clamp cylinder 88, shown in FIGS. 6 and 7 and to operate twist lock connections. In particular, a first twist lock connection 32 is provided to lock lower frame 34 in the upward untilted position, so that cable 60 and the pulley arrangement need not bear the strain of carrying container 20 except during tipping operation. Second twist lock connectors 90 are provided at the corners of lower frame 34 for attachment of lower frame 34 to container 20.

FIG. 5 provides a front view of the tipping apparatus mounted on an intermodal container transfer device 10. The intermodal container 20 is connected to the lower frame 34 by the twist lock connections 90 and is shown in a tipped position, i.e. one end of the container 20 is tipped downwards as winch 62 extends a cable 60. The contents of container 20 are thereby discharged as a result of the opening of door 82. FIG. 5 also illustrates the structural relationship between the tipping apparatus and the transfer device 10; namely, that the tipping apparatus is arranged such that a middle frame 32 is aligned with and mounted beneath an upper frame 16. Middle frame 32 is pivotally attached at one end to a lower from 34 at pivot pins 64 and 66 and attached at the other end by a pulley means 60.

It will be appreciated by those skilled in the art that the apparatus of the invention can be operated by a single operator from the cab of the lift truck. Connection pneumatic cables 96 interconnect the various operating parts of the apparatus to the cab of truck 10 for use by the operator. The various controls include frame adjustment cylinders 72, 76, 91 and 93, door lock cylinder 88, first twist lock 94, container attachment second twist lock 89 and winch 62. These operating parts and the lift and drive of truck 10 can accordingly be operated from the cab and enable a single operator to engage a container, lift and position it in a place where it is to be emptied, unlock and tilt the lower frame while unlocking the door clamp to empty the container, transport the container to an empty container area and release the container from the lower frame.

While the operating parts of the apparatus are described as being pneumatic in nature, those skilled in the art will understand that such operating parts may alternately be hydraulically electrically operated or a combination. The only connection that may need to be made in connection with operation of the apparatus is the connection to the pneumatic or other operating line of the container. This can be achieved, for example at the same time that a chain or other secure connection between door 82 and the body of container 20 is released before an emptying operation.

While there have been described what are believed to be the preferred embodiments of the present invention, those skilled in the art will recognize that other and further changes and modifications may be made thereto without department from the spirit of the invention, and it is intended to claim all such changes and modifications that fall within the true scope of the invention.

What is claimed is:

1. An intermodal container tipping apparatus adapted to be mounted onto on intermodal container transfer device comprising:
   a first frame member connected to the transfer device;
   a second frame member aligned substantially parallel to the first frame member and pivotally connected thereto at corresponding end portions of said frame members, and wherein the second frame member has at least one attachment device which engages a substantially topedge portion of an intermodal container, a portion of said container is adapted to be opened;

a motor located on at least one frame member for operating a cable connecting the first and second frame members which when activated lowers at least a portion of the second frame member relative to the first frame member.

2. The apparatus according to claim 1, wherein said first frame member is adapted to be connected to the intermodal container transfer device chosen from the group consisting of a crane, a gantry arrangement and a lift truck.

3. The apparatus according to claim 2 wherein said transfer device includes a frame adapted to engage the first frame member.

4. The apparatus according to claim 3, wherein said first frame member is mounted to the transfer device frame by adjustable mounting members.

5. The apparatus according to claim 4, wherein said adjustable mounting members are hydraulically or pneumatically operated and arranged to be controlled by an operator of said transfer device.

6. The apparatus according to claim 1, wherein said second frame member is adapted to be connected to said first frame member with first twist lock connections.

7. The apparatus according to claim 6, wherein said first twist lock connections are connected to said transfer device through pneumatic or hydraulic lines for operator control of said first twist lock connections.

8. The apparatus according to claim 1, wherein said second frame member is adapted to be connected to an intermodal container with second twist lock connections.

9. The apparatus according to claim 8, wherein said second twist lock connections are connected to said transfer equipment device through pneumatic or hydraulic lines for operator control of said second twist lock connections.

10. The apparatus according to claim 1, wherein a pulley system including the cable is provided to interconnect said first and second frame members and which enables the lower frame and engaged intermodal container to be lowered at one end.

11. The apparatus according to claim 1, wherein the intermodal container has an end portion which can be opened hydraulically or pneumatically by pneumatic or hydraulic lines connected to said transfer equipment device.

* * * * *